US012184126B2

(12) United States Patent
Gemer et al.

(10) Patent No.: US 12,184,126 B2
(45) Date of Patent: Dec. 31, 2024

(54) SELF-HEATING ELECTRIC MOTOR CONTROL

(71) Applicant: Lunar Outpost Inc., Golden, CO (US)

(72) Inventors: Andrew Josef Gemer, Lafayette, CO (US); Justin Cyrus, Golden, CO (US); Luke Bowersox, Golden, CO (US)

(73) Assignee: Lunar Outpost Inc., Golden, CO (US)

( * ) Notice: Subject to any disclaimer, the term of this patent is extended or adjusted under 35 U.S.C. 154(b) by 250 days.

(21) Appl. No.: 18/048,752

(22) Filed: Oct. 21, 2022

(65) Prior Publication Data

US 2023/0129911 A1 Apr. 27, 2023

Related U.S. Application Data

(60) Provisional application No. 63/270,183, filed on Oct. 21, 2021.

(51) Int. Cl.
*H02K 1/32* (2006.01)
*H02K 15/12* (2006.01)

(52) U.S. Cl.
CPC ............. *H02K 1/32* (2013.01); *H02K 15/125* (2013.01)

(58) Field of Classification Search
CPC ........ H02K 1/32; H02K 15/125; H02P 29/60; H02P 29/62; H02P 29/64; H02P 29/66; H02P 29/68; H02P 25/03; H02P 25/062; H02P 25/064; H02P 27/06; H02P 1/42; H02P 1/46; B60L 2260/56; B60L 58/27
See application file for complete search history.

(56) References Cited

U.S. PATENT DOCUMENTS

2019/0346182 A1* 11/2019 Ishiyama ............. F25B 31/002

* cited by examiner

*Primary Examiner* — Antony M Paul

(57) ABSTRACT

Aspects of the present disclosure relate to self-heating electric motor control. In examples, a motor controller includes a normal control scheme and a heating control scheme, whereby the heating control scheme causes the electric motor to produce heat (in addition to or in the absence of mechanical operation of the electric motor). For example, if the electric motor has cooled below a minimum operating temperature, the heating control scheme is used to heat the electric motor prior to mechanical operation of the electric motor. As another example, the electric motor may approach or fall below a minimum operating temperature during operation, such that the heating control scheme is used to cause the electric motor to produce additional heat while in operation. Thus, the electric motor is heated as a result of the heating control scheme, as are one or more associated mechanical or electrical components.

20 Claims, 5 Drawing Sheets

SELF-HEATING ELECTRIC MOTOR CONTROL

CROSS-REFERENCE TO RELATED APPLICATION

This application claims priority to U.S. Provisional Application No. 63/270,183, titled "Inductive Self Heating of Brushless Motors (FluxHeat™)," filed on Oct. 21, 2021, the entire disclosure of which is hereby incorporated by reference in its entirety.

BACKGROUND

Vehicles, electronic devices, and other hardware have a range of operating temperatures, outside of which, unexpected or unintended operation, or even failure, may result. For example, a mechanical component may seize and/or an electronic component may no longer function below a minimum temperature. As another example, damage may result outside of such operating temperature ranges. For instance, the lunar surface exhibits a wide temperature range and the extreme cold of the lunar night or in permanently shadowed regions (PSRs) can cause mechanical and electrical components of landers, rovers, or other hardware to fail.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to self-heating electric motor control. In examples, a motor controller includes a normal control scheme and a heating control scheme, whereby the heating control scheme causes the electric motor to produce heat (in addition to or in the absence of mechanical operation of the electric motor). For example, if the electric motor has cooled below a minimum operating temperature, the heating control scheme is used to heat the electric motor prior to mechanical operation of the electric motor. As another example, the electric motor may approach or fall below a minimum operating temperature during operation, such that the heating control scheme is used to cause the electric motor to produce additional heat while in operation. Thus, the electric motor is heated as a result of the heating control scheme, as are one or more associated mechanical or electrical components.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
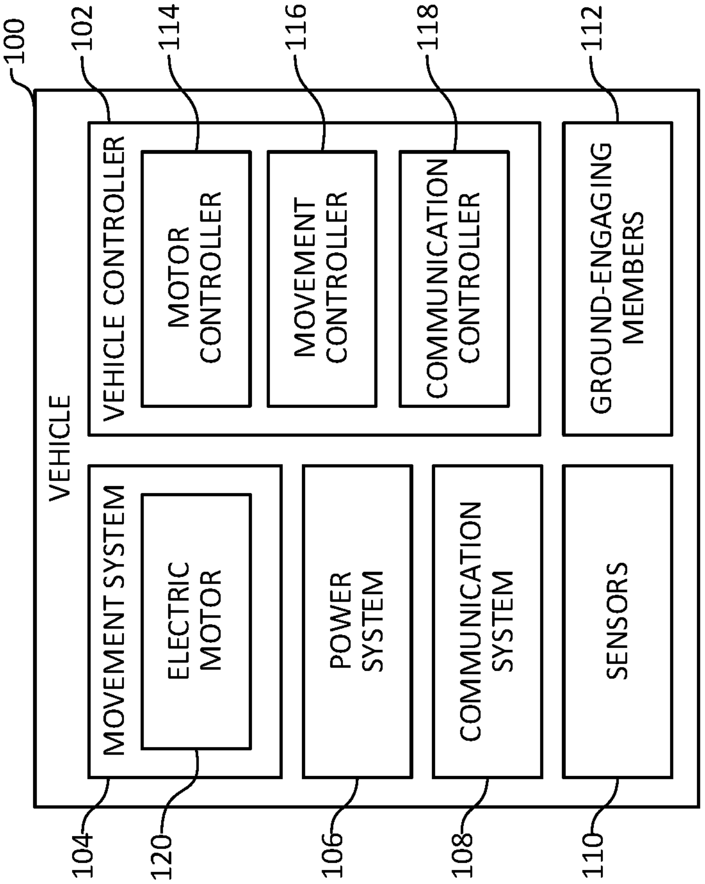
FIG. 1 illustrates a conceptual diagram of an example vehicle with which a self-heating electric motor may be used according to aspects described herein.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Some electrical and mechanical hardware operate in environments having very low temperatures or a high degree of temperature variability. This is especially true for hardware operating on the Moon or on Mars, among other examples. For instance, a lander or rover on the Moon may be located at a region that is periodically or entirely shielded from solar radiation, such that temperatures at the region exceed a minimum operating temperature of such hardware. Similarly, hardware operating in a polar climate (e.g., the Arctic or *Antarctica*) or other region of extreme cold may be designed with special consideration given to thermal management in extremely cold conditions.

As an example, hardware includes a brushless direct current (DC) motor or other electric motor, for example to power one or more ground-engaging members, to actuate a robotic arm or a door, or for any of a variety of additional or alternative purposes. However, under extremely cold conditions, components of the electric motor and/or components to which the motor is coupled (e.g., a gearbox or a robotic arm) may become brittle and/or may change in size, such that operation of the electric motor under such conditions may cause temporary or permanent damage to the hardware. Similarly, seals may shrink and become brittle, such that they have reduced effectiveness. In some examples, lubricant may become so viscous that operation of the electric motor can cause one or more components to sheer or otherwise break. As another example, electronic components associated with the electric motor may also be affected by the extreme cold, such as a motor controller or a hall effect sensor of the electric motor itself.

In some examples, cartridge heaters, patch heaters, or other types of resistive heating are used to maintain the temperature of hardware in extremely cold conditions. However, such heating technologies may be inefficient, as the result of DC power transmission losses and indirect heating of components (e.g., via multiple thermal interfaces between the heater and the component to be heated). Additionally, such heating solutions may introduce additional size, weight, power, design complexity, and/or cost to development and operation of the hardware, which is especially detrimental for hardware in resource-constrained environments. Thus, it is difficult to efficiently heat hardware in such extreme environments.

Accordingly, aspects of the present application relate to a self-heating electric motor. In examples, a motor controller (also referred to as an electronic speed controller or "ESC") operates the electric motor according to a heating control scheme that causes the electric motor to produce heat (e.g., in addition to or as an alternative to mechanical operation of the electric motor). For example, if the electric motor has cooled below a minimum operating temperature (e.g., overnight or after a period of inactivity in an extremely cold environment), the heating control scheme is used to heat the motor prior to mechanical operation of the electric motor. As another example, the motor may approach or fall below a minimum operating temperature during operation, such that the heating control scheme is used to cause the electric motor to generate additional heat while still in operation.

Thus, a heating control scheme according to aspects described herein includes a static heating control scheme (e.g., substantially in the absence of mechanical operation of the electric motor) and/or a dynamic heating control scheme (e.g., while the motor may additionally be engaged in mechanical operation). The heating control scheme (e.g., as may be implemented by the motor controller) uses the intrinsic electromagnetic properties of the electric motor to generate heat within the electric motor itself, where the motor windings are used as an inductive coil, while the ferrite core is used as an inductive load. As compared to a normal control scheme for the electric motor (e.g., as may be used for normal or more efficient mechanical operation of the electric motor), the heating control scheme may cause the electric motor to operate in a way that is less efficient in producing mechanical energy, thereby causing additional heat to be produced by the electric motor.

The disclosed aspects provide various benefits over other heating technologies (examples of which were mentioned above). For example, parasitic losses during power transmission may be reduced through the use of the alternating current (AC) signal that is used to power the electric motor. As another example, given electric motors and/or other associated components are likely to be the subject of thermal management, operating an electric motor according to the disclosed heating control scheme introduces heat more directly to the electric motor and associated components as compared to a cartridge or patch heater. This may result in less heat lost through a variety of thermal interfaces (e.g., between a resistive heater and the ultimate target of the heat). Additionally, the disclosed aspects may decrease the weight, power, design complexity, and/or cost that is associated with thermal management, as additional or otherwise special—or single-purpose components to provide heating need not be included or may be reduced.

Finally, the disclosed aspects may be implemented by any of a variety of motor controllers and may be used in conjunction with any of a variety of electric motors, such that specialized components may be omitted or their incidence may be reduced. For instance, the disclosed aspects may be used to produce heat in a brushed motor, where, in some examples, a mechanical brake may be included to inhibit mechanical operation of the brushed motor when operated according to a heating control scheme depending on the motor temperature. It will further be appreciated that other examples may include any of a variety of additional or alternative benefits.

FIG. 1 illustrates a conceptual diagram of an example vehicle 100 with which a self-heating electric motor may be used according to aspects described herein. As noted above, the disclosed aspects may similarly be implemented by any of a variety of other types of hardware in other examples. As illustrated, vehicle 100 includes vehicle controller 102, movement system 104, power system 106, communication system 108, sensors 110, and ground-engaging members 112.

It will be appreciated that vehicle 100 may be any of a variety of vehicles, including, but not limited to, a rover or a robot. Vehicle 100 is illustrated as further including one or more ground-engaging members 112. Example ground-engaging members include, but are not limited to, wheels or tracks. In examples, vehicle 100 may be remotely controlled (e.g., via communication system 108) and/or may be autonomously controlled (e.g., as may be affected by vehicle controller 102).

Movement system 104 may include a prime mover (e.g., an electric motor or an internal combustion engine) to power ground-engaging members 112, as well as a steering system, which may control a steering angle of one or more ground-engaging members 112 and/or may cause ground-engaging members 112 to be powered differently to achieve rotation about an axis. In examples, movement controller 116 of vehicle controller 102 controls movement system 104 to affect movement of vehicle 100 accordingly. For example, movement controller 116 may cause movement system 104 to propel vehicle 100 forward, backward, or in any of a variety of other directions. Movement controller 116 may control movement system 104 according to one or more commands that are received by vehicle 100 (e.g., via communication system 108) from a remote device (not pictured) and/or may control movement system 104 at least partially automatically (e.g., based on data from sensors 110; according to the disclosed environment-based thermal management aspects).

Movement system 104 is illustrated as comprising electric motor 120. In examples, electric motor 120 operates as a prime mover of vehicle 100 or as a motor of the steering system. In another example, electric motor 120 is part of a robotic arm assembly of vehicle 100 or is configured to actuate a door of vehicle 100. Thus, it will be appreciated that electric motor 120 may be configured to provide any of a variety of functionality of vehicle 100. In an example, electric motor 120 is a three-phase motor. It will be appreciated the electric motor 120 may have any number of phases in other examples. Similarly, any of a variety of winding and/or electrical configurations (e.g., a delta configuration or a wye configuration) may be used.

As illustrated, operation of electric motor 120 is controlled by motor controller 114. While motor controller 114 is illustrated as part of vehicle controller 102, it will be appreciated that, in other examples, motor controller 114 may be a separate controller. In some examples, motor controller 114 (or, as another example, vehicle controller 102) is proximal to electric motor 120, such that heat generated by electric motor 120 according to aspects described herein propagates to motor controller 114 to maintain the operating temperature of motor controller 114 above a minimum operating temperature.

Power system 106 may provide electrical power to movement system 104, communication system 108, and/or vehicle controller 102, among other examples. As an example, power system 106 provides DC power to motor controller 114, which is used by motor controller 114 to generate one or more phases of AC power that ultimately power electric motor 120 accordingly. In examples, power system 106 includes a battery and a solar panel with which to recharge the battery. As another example, power system 106 may include a radioisotope thermoelectric generator. Thus, it will be appreciated that vehicle 100 may include any of a variety of power sources and, similarly, any of a variety of movement systems may be used to propel vehicle 100 accordingly.

Communication system 108 may include any of a variety of communication technologies to provide wired and/or wireless communication for vehicle 100. Communication controller 118 of vehicle controller 102 may control communication system 108, thereby enabling communication to and/or from vehicle 100. For example, communication controller 118 may configure one or more radios of communication system 108 and/or may establish a connection with one or more remote devices (not pictured).

Sensors 110 of vehicle 100 may include any of a variety of sensors, including, but not limited to, image capture devices (e.g., visible light and/or infrared cameras), light sensors, proximity sensors, temperature sensors (e.g., thermocouples or thermistors), three-dimensional mapping sensors (e.g., using multiple image capture devices or a light detection and ranging (LIDAR) system), and/or chemical composition sensors, among other examples.

Vehicle controller 102 is illustrated as further comprising motor controller 114. In examples, motor controller 114 is an electronic speed controller (ESC) for electric motor 120. As noted above, motor controller 114 may have multiple control schemes, including a normal control scheme and a heating control scheme. In examples, an ESC is programmed to include firmware that implements such control schemes, thereby reducing or avoiding the need to use specialized hardware to implement the self-heating electric motor aspects described herein.

When operating according to a normal control scheme, motor controller 114 generates a control signal (e.g., as may be used to operate a gated power switch, such as a metal-oxide-semiconductor field-effect transistor (MOSFET) or other transistor) for electric motor 120, thereby causing operation of electric motor 120. In an example where electric motor 120 is a three-phase motor, motor controller 114 generates three phases of AC power (e.g., using DC power from power system 106). Motor controller 114 modulates the three AC phases, such that each phase is substantially sinusoidal and out of phase with one another by approximately 120 degrees (e.g., such that the peak amplitude of the first, second, and third phases occurs at approximately 0 degrees, 120 degrees, and 240 degrees, respectively).

Motor controller 114 may control the period, amplitude, and/or any of a variety of other characteristics of the three phases of AC power, for example to control the rotational speed and/or torque output of electric motor 120 accordingly. Thus, under the normal control scheme, motor controller 114 generates a normal control signal (an example of which is described above for a three-phase motor) to thus manage the mechanical operation of electric motor 120 accordingly. It will be appreciated that similar techniques may be used for electric motors having a different number of phases.

When operating according to a heating control scheme, motor controller 114 generates a control signal for electric motor 120 that causes electric motor 120 to produce additional heat (e.g., in addition to heat that would ordinarily be produced by operation of electric motor 120 according to a normal control scheme).

In an example, motor controller 114 generates a control signal to cause single-phasing of electric motor 120 according to a heating control scheme. Single-phasing may occur when one of the input signals (e.g., one of the three phases for a three-phase motor) is disconnected, thus causing the signals to become out of phase and resulting in excess heat generation by the electric motor. Accordingly, motor controller 114 selectively masks or disables one phase of a plurality of phases or otherwise modulates only a subset of phases, thereby causing electric motor 120 to operate using only a subset of phases.

In examples, motor controller 114 alternates between phases, thereby reducing the duration that each working (e.g., unmasked) phase is used to drive electric motor 120. For example, a first phase is masked while a second and third phase are unmasked. After a predetermined amount of time or after a temperature threshold is reached for the second and/or third phases, the first phase is unmasked and the second is masked, thus now operating electric motor 120 using the first and third phases. Finally, the second phase is unmasked and the third phase is masked, thus now operating electric motor 120 using the first and second phases. As such, continuing with the example three-phase motor, single-phasing may be induced using each phase one-third of the time, such that the two remaining phases are powered the remaining two-thirds of the time. Phases may be masked according to a predetermined order or may be dynamically masked based on a temperature, current draw, and/or resistance of a phase of electric motor 120, among other examples.

Additionally, or alternatively, single-phasing is induced for only a subpart of a duty cycle. Thus, for a first part of a duty cycle, all phases are used to operate electric motor 120 (e.g., similar to a normal control scheme), while only a subset of phases are used to operate electric motor 120 for a second part of the duty cycle. The first and second subparts may be selected to result in a predetermined amount of power draw and/or a predetermined amount of heating to occur, among other examples.

Selective phase masking and/or periodic single-phasing when operating according to a heating control scheme may reduce the wear on electric motor 120, may control the resulting heat that is produced, and/or may manage the energy consumed by electric motor 120 (e.g., so as to not exceed the capability of power system 106), among other benefits. As single-phasing occurs when electric motor 120 is operating, single-phasing may be used as a dynamic heating control scheme.

As another example heating control scheme, motor controller 114 generates a high-frequency AC signal (e.g., as compared to a normal operating mode; greater than 10 kHz or approximately 100 kHz), thereby inducing or otherwise amplifying eddy currents within electric motor 120. The high-frequency signal may be tuned to improve heating performance and/or transmission efficiency (e.g., according to characteristics of electric motor 120).

As an example, if electric motor 120 is stationary, a high-frequency AC signal may be provided to one or more phases, thereby producing heat within electric motor 120 prior to mechanical operation of electric motor 120 (which may thus be referred to herein as a static heating control scheme). Similarly, a high-frequency AC signal may be provided while electric motor 120 is in operation (e.g., similar to operation under a normal control scheme), thereby producing heat within electric motor 120 while electric motor 120 is in operation (which may be referred to herein as a dynamic heating control scheme). Similar to the single-phasing example above, a subset of phases may be selected and/or one or more phases may be dynamically selected for use according to the disclosed induction heating techniques. Additionally, or alternatively, such an induction control signal may be generated for a subpart of a duty cycle (while the another subpart of the duty cycle comprises a control signal that is substantially consistent with normal operation of electric motor 120). It will be appreciated that while single-phasing may be used with electric motors having a plurality of phases, an induction control signal may be used to produce heat using any of a variety of electric motors.

While example heating control schemes are described, it will be appreciated that any of a variety of additional or alternative techniques may be used in other examples. As another example, single-phasing and induction heating may be used together (e.g., contemporaneously or as constituent subparts of a duty cycle). For instance, a first subpart of a duty cycle may be substantially consistent with operation under a normal control scheme, a second subpart of the duty cycle may comprise single-phasing, and a third subpart of the duty cycle may comprise induction heating.

In examples, electric motor 120 includes a temperature sensor and/or a temperature sensor may be located near a component to be heated by electric motor 120. Accordingly, motor controller 114 evaluates a temperature reported by the temperature sensor and determines whether to operate electric motor 120 according to a normal control scheme or a heating control scheme. As another example, motor controller 114 selects between a static heating control scheme and a dynamic heating control scheme. In some examples, a dynamic heating control scheme alters aspects of the mechanical operation of electric motor 120. For example, the dynamic heating control scheme may further define a maximum rotational speed and/or a maximum torque output, thereby reducing the likelihood of damage to electric motor 120 and/or associated components.

In some instances, multiple thresholds are used to evaluate a temperature reported by a temperature sensor. For instance, if a temperature is below a first temperature threshold, electric motor 120 may be operated according to a dynamic heating control scheme, as the motor and/or associated components may be cold but not cold enough that mechanical operation of the motor would result in damage. However, if the temperature is below a second temperature threshold (e.g., lower than the first temperature threshold), electric motor 120 may be operated according to a static heating control scheme, thereby warming electric motor 120 and/or associated components prior to mechanical operation of electric motor 120.

In examples, motor controller 114 transitions from a static heating control scheme to a dynamic heating control scheme (e.g., once the second temperature threshold is reached), and finally from the dynamic heating control scheme to a normal control scheme (e.g., once the first temperature threshold is reached), or vice versa. Additional examples of normal, static heating, and dynamic heating control schemes are discussed below with respect to method 300 and method 400 of FIG. 3 and FIG. 4, respectively.

Figure 2:
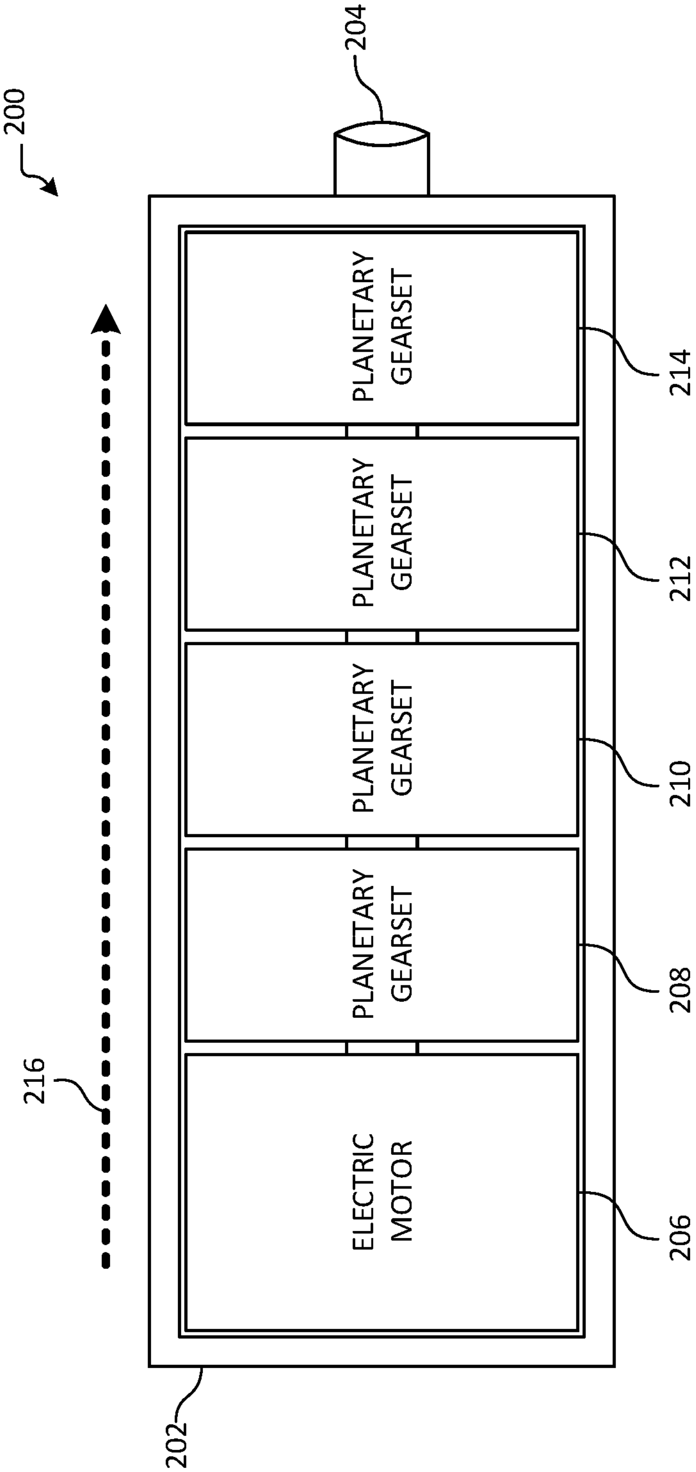
FIG. 2 illustrates a conceptual diagram of an example gearbox assembly in which a self-electric heating motor may be used according to the present disclosure.

FIG. 2 illustrates a conceptual diagram of an example gearbox assembly 200 in which a self-heating electric motor may be used according to the present disclosure. In examples, gearbox assembly 200 is used to power one or more ground-engaging members, to actuate a robotic arm or a door, or for any of a variety of additional or alternative purposes. Gearbox assembly 200 is illustrated as comprising electric motor 206, aspects of which may be similar to electric motor 120 discussed above with respect to FIG. 1 and are therefore not necessarily redescribed in detail below.

Gearbox assembly 200 includes enclosure 202, inside of which electric motor 206 and planetary gearsets 208, 210, 212, and 214 are disposed. Gearsets 208, 210, 212, and 214 transfer torque from electric motor 206 to output shaft 204. While four planetary gearsets 208, 210, 212, and 214 are illustrated, it will be appreciated that any number of gearsets and/or any type of gears may be used in other examples.

In examples, electric motor 206 is operated according to a heating control scheme, thereby causing heat to propagate from electric motor 206 to planetary gearsets 208, 210, 212, and 214 (e.g., as illustrated by arrow 216). Electric motor 206 may include a thermal sensor, such that a motor controller (e.g., motor controller 114 in FIG. 1) may selectively operate electric motor 206 according to a normal control scheme or a heating control scheme accordingly.

As another example, a thermal sensor may be placed proximate to one or more of planetary gearsets 208, 210, 212, and 214. The motor controller may determine whether a sufficient amount of heat has propagated from electric motor 206 to the thermal sensor (e.g., as compared to a predetermined threshold), such that electric motor 206 may transition from a static or dynamic heating control scheme to a dynamic or normal heating control scheme, respectively. Thus, it will be appreciated that the control techniques described herein may be based on one or more temperature sensors within or proximal to an electric motor and/or one or more associated components (e.g., gearsets 208, 210, 212, and/or 214).

In examples, control circuitry or other electronics (not pictured), which may include the motor controller, may be proximal to electric motor 206 or may otherwise be placed in a configuration to allow heat to propagate from electric motor 206 to the electronics (e.g., via a heat pipe or other thermally conductive material).

As illustrated, electric motor 206 and gearsets 208, 210, 212, and 214 are each coupled via associated output shafts, such that heat produced by electric motor 206 may propagate via conduction through such shafts (e.g., from electric motor 206 to planetary gearset 208, from planetary gearset 208 to planetary gearset 210, and so on). A material of at least a portion of the shafts may be selected to offer improved thermal conductivity (e.g., copper, aluminum, or a steel alloy). As another example, a configuration may be used that establishes additional contact between electric motor 206 and planetary gearsets 208, 210, 212, and 214 (rather than just the illustrated shafts). A thermal interface material may be used to promote heat transfer between such components in some examples. Additionally, or alternatively, enclosure 202 may contain a lubricant that facilitates heat transfer from electric motor 206. The lubricant may be selected to offer improved thermal conductivity, such as a lubricant that includes boron, boron nitride, zinc, and/or graphite, among other examples.

It will be appreciated that heat may also propagate via radiation. In examples, emissivity and/or absorptivity may be improved using a variety of surface preparations and/or coatings. As another example, heat may also propagate via convection, as may be the case if enclosure 202 includes a fluid through which convection can occur.

In examples, enclosure 202 may be proximate to components that need not be headed by electric motor 206. Accordingly, an insulating layer may be used on the exterior of enclosure 202 to improve heat retention of enclosure 202. As another example, an insulating layer may be used on the interior of enclosure 202 (e.g., between an inner surface of enclosure 202, and electric motor 206 and gearsets 208, 210, 212, and 214). Insulation may additionally or alternatively be provided through radiative insulation, where the interior surface of enclosure 202 includes a coating that reduces absorptivity or increases reflectivity. Similarly, internal components of enclosure 202 may be coated to reduce emissivity.

While various materials are described according to the present examples, it will be appreciated that any of a variety of other materials may be used in other examples. For examples, materials that are not conducive to heat transfer may be used, as may be the case when certain design considerations weigh in favor of using plastics, ceramics, or elastomers, among other examples. Even so, the disclosed aspects would still yield improved heat delivery capabilities as heat propagates, albeit at a potentially reduced rate, from electric motor 206 operating under a heating control scheme to any of a variety of such components.

Figure 3:
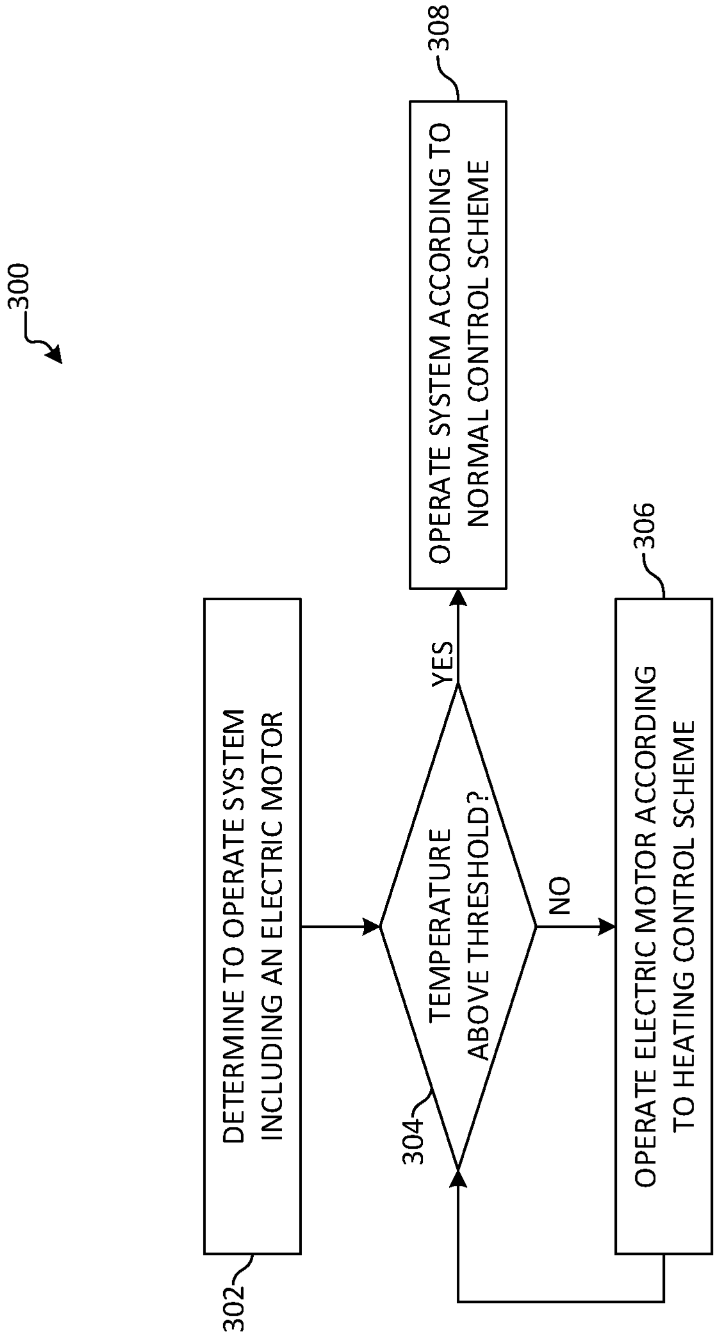
FIG. 3 illustrates an overview of an example method for inductive heating of an electric motor according to aspects described herein.

FIG. 3 illustrates an overview of an example method 300 for inductive heating of a brushless motor according to aspects described herein. In examples, aspects of method 300 are performed by a motor controller, such as motor controller 114 in FIG. 1.

Method 300 begins at operation 302, where it is determined to operate a system that includes an electric motor (e.g., electric motor 120 in FIG. 1 or electric motor 206 in FIG. 2). In examples, the determination results from an indication that is received from an operator (e.g., via a remote computing device, as may be received via a communication system such as communication system 108). In other examples, the determination is made as a result of evaluating one or more conditions. Thus, it will be appreciated that it may be determined to operate the system based on any of a variety of considerations, including or in the absence of manual input from the operator.

While method 300 is illustrated as an example in which the system itself includes the electric motor, it will be appreciated that similar techniques may be used in instances where the electric motor is instead only incident to the system. For instance, the electric motor may be mechanically coupled to the system or may otherwise be proximal to the system (e.g., such that heat can propagate from the electric motor to the system), even though operation of the electric motor may be separate from operation of the system itself. In fact, similar techniques may be used to warm a system that does not include any moving parts via an electric motor, as may be the case when thermal contraction is problematic for the system and/or when electronics of the system are below an associated minimum operating temperature.

Flow progresses to determination 304, where it is determined whether a temperature is above a threshold. In examples, the temperature is obtained from a temperature sensor of the system. For example, the electric motor may include a temperature sensor and/or one or more other components may include a temperature sensor. In examples, a temperature sensor is located proximal to a component of the system that is comparatively more or most sensitive to cold conditions. The temperature threshold may be based on one or more materials of the system, an amount of wear of the system, and/or an amount of strain (e.g., torque) to be placed on the system when operating, among other examples. For instance, if the system will be used relatively lightly, a lower temperature threshold may be used than if the system is to be used at a higher intensity.

If it is determined that the temperature is above the temperature threshold, flow branches "YES" to operation 308, where the system is operated according to a normal control scheme. Method 300 terminates at operation 308.

By contrast, if it is determined that the temperature is not above the temperature threshold, flow instead branches "NO" to operation 306, where the electric motor of the system is operated according to a heating control scheme according to aspects of the present disclosure. For example, the heating control scheme may cause the electric motor to produce heat via inductive heating, among other static heating control schemes (given it is determined the system is too cold to engage in mechanical operation).

Flow then returns to determination 304, where it is again determined whether the temperature is above the temperature threshold. Thus, the electric motor is operated according to the heating control scheme at operation 306 until it is determined that the temperature is above the temperature threshold, at which point flow instead branches "YES" to operation 308 and operation continues under the normal control scheme accordingly.

Figure 4:
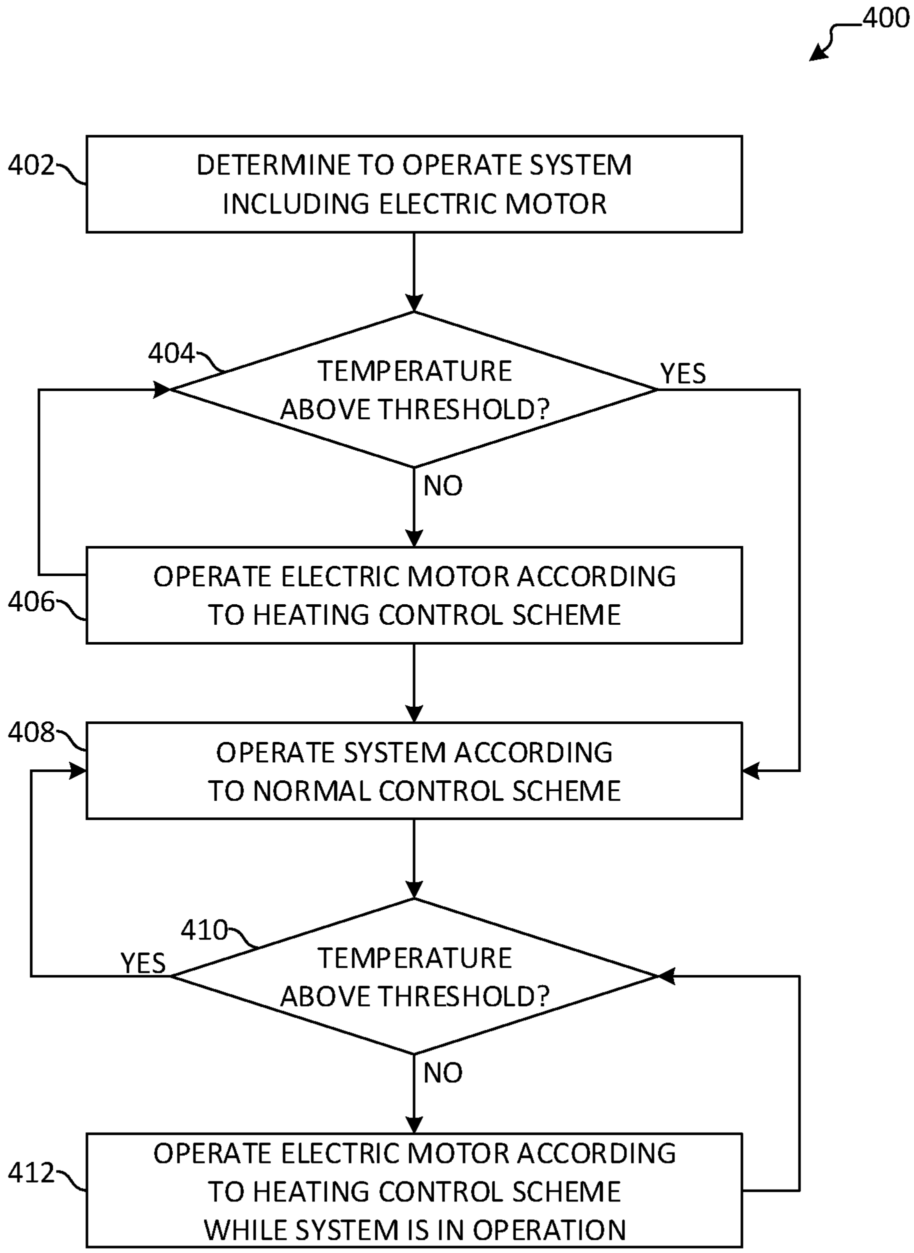
FIG. 4 illustrates an overview of another example method for inductive heating of an electric motor according to aspects described herein.

FIG. 4 illustrates an overview of another example method 400 for inductive heating of a brushless motor according to aspects described herein. In examples, aspects of method 400 are performed by a motor controller, such as motor controller 114 in FIG. 1.

As compared to method 300 in FIG. 3, method 400 includes temperature monitoring while the system is operating, as may be the case when operation of the system does not generate sufficient heat to maintain the temperature of the system above a minimum operating temperature (e.g., heat is lost to the environment more quickly than it is produced under normal operation).

Method 400 begins at operation 402, where it is determined to operate a system that includes an electric motor (e.g., electric motor 120 in FIG. 1 or electric motor 206 in FIG. 2). In examples, the determination results from an indication that is received from an operator (e.g., via a remote computing device, as may be received via a communication system such as communication system 108). In other examples, the determination is made as a result of evaluating one or more conditions. Thus, it will be appreciated that it may be determined to operate the system based on any of a variety of considerations, including or in the absence of manual input from the operator. As noted above with respect to method 300, while method 400 is illustrated as an example in which the system itself includes the electric motor, it will be appreciated that similar techniques may be used in instances where the electric motor is instead only incident to the system.

Flow progresses to determination 404, where it is determined whether a temperature is above a threshold. Aspects of determination 404 may be similar to those discussed above with respect to determination 304 of method 300 in FIG. 3 and are therefore not necessarily redescribed in detail. For example, the temperature may be obtained from a temperature sensor of the electric motor and/or of one or more other components. The temperature threshold that is evaluated at determination 404 may be based on one or more materials of the system, an amount of wear of the system, and/or an amount of strain (e.g., torque) to be placed on the system when operating, among other examples.

If it is determined that the temperature is above the temperature threshold, flow branches "YES" to operation 408, where the system is operated according to a normal control scheme. By contrast, if it is determined that the temperature is not above the temperature threshold, flow instead branches "NO" to operation 406, where the electric motor of the system is operated according to a heating control scheme according to aspects of the present disclosure. For example, the heating control scheme may cause the electric motor to produce heat via inductive heating, among other static heating control schemes (given it is determined the system is too cold to engage in mechanical operation).

Flow then returns to determination 404, where it is again determined whether the temperature is above the temperature threshold. Thus, the electric motor is operated according to the heating control scheme at operation 406 until it is determined that the temperature is above the temperature threshold, at which point flow instead branches "YES" to operation 408 and operation continues under the normal control scheme accordingly.

Flow continues from operation 408 to determination 410, where it is determined whether the temperature is above a threshold. In examples, the threshold evaluated at determination 410 is the same as the threshold that was evaluated at determination 404. In other examples, a different threshold is used, as may be the case when a static heating control scheme is used to reach a first temperature threshold and a dynamic heating control scheme is used to maintain a temperature above a second temperature threshold. Similar to determination 404, the temperature threshold that is evaluated at determination 410 may be based on one or more materials of the system, an amount of wear of the system, and/or an amount of strain (e.g., torque) to be placed on the system when operating, among other examples. For example, the temperature threshold that is evaluated at determination 410 changes throughout the course of operation, as may be the case when the amount of load on the system varies over time.

If it is determined that the temperature is above the threshold, flow branches "YES" and returns to operation 408, such that operation continues according to the normal control scheme. By contrast, if it is determined that the temperature is not above the threshold, flow branches "NO" and instead progresses to operation 412, where the electrical motor is operated according to a dynamic heating control scheme (e.g., while the system is under continued operation).

Thus, rather than suspending operation until the temperature threshold has been reached (as may be performed in other examples, such as when the reduced torque resulting from the heating control scheme would affect operation of the system), operation of the system continues according to the dynamic heating control scheme according to aspects described herein. For example, the heating control scheme may cause the electric motor to produce heat via inductive heating or via single-phasing, among other dynamic heating control schemes.

Flow then returns to determination 410, where it is again determined whether the temperature is above the temperature threshold. Thus, the electric motor is operated according to the dynamic heating control scheme at operation 412 until it is determined that the temperature is above the temperature threshold, at which point flow instead branches "YES" to operation 408 and operation continues under the normal control scheme accordingly. Eventually, method 400 terminates at operation 408 or operation 412, among other examples.

Figure 5:
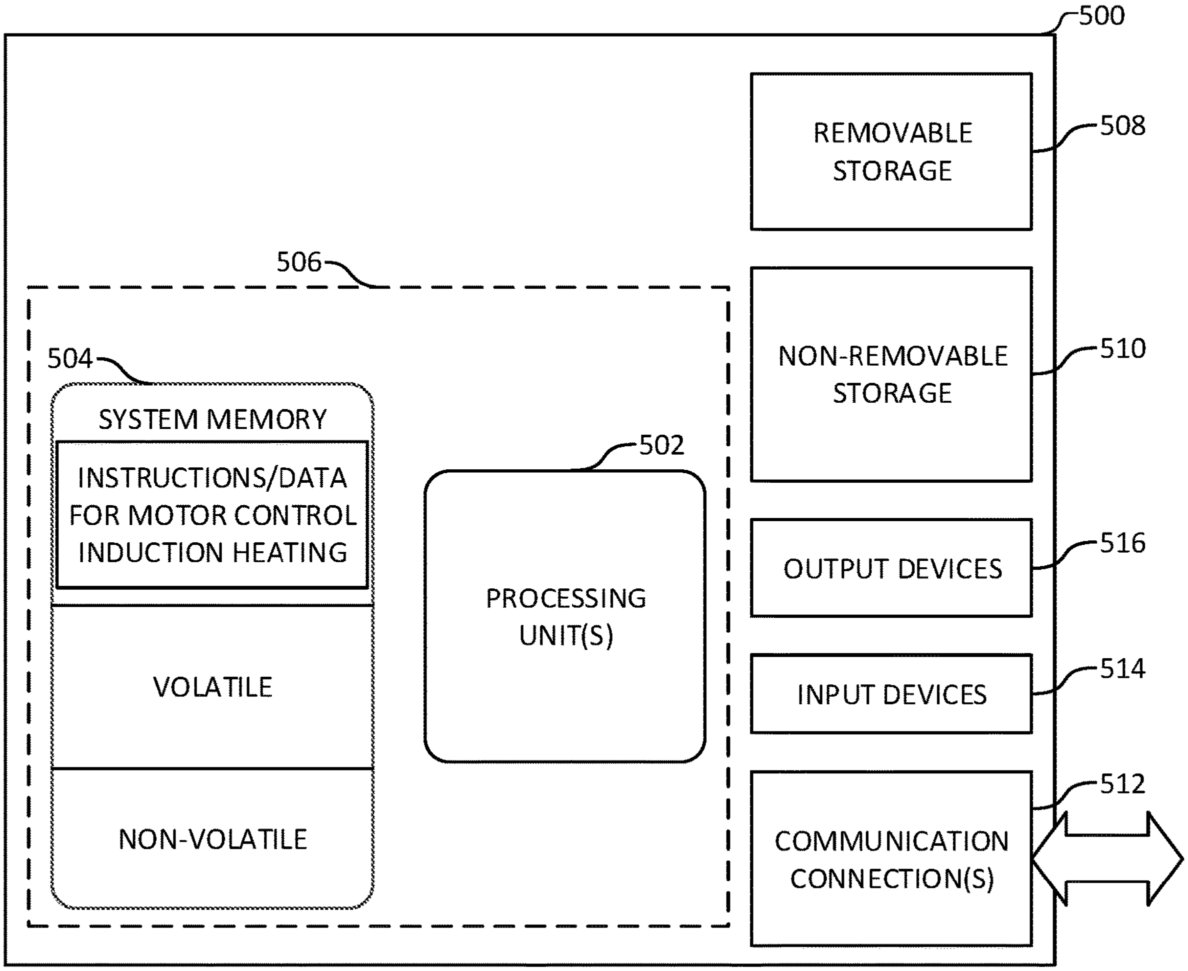
FIG. 5 illustrates an example of a suitable computing environment in which one or more aspects of the present application may be implemented.

FIG. 5 illustrates an example of a suitable computing environment 500 in which one or more of the present embodiments may be implemented. For example, aspects of computing environment 500 may be used by a controller, such as vehicle controller 102 in FIG. 1. This is only one example of a suitable computing environment and is not intended to suggest any limitation as to the scope of use or functionality. Other computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, computing environment 500 typically may include at least one processing unit 502 and memory 504. Depending on the exact configuration and type of computing device, memory 504 (storing, among other things, APIs, programs, etc. and/or other components or instructions to implement or perform the system and methods disclosed herein, etc.) may be volatile (such as RAM), non-volatile (such as ROM, flash memory, etc.), or some combination of the two. This most basic configuration is illustrated in FIG. 5 by dashed line 506. Further, environment 500 may also include storage devices (removable, 508, and/or non-removable, 510) including, but not limited to, magnetic or optical disks or tape. Similarly, environment 500 may also have input device(s) 514 such as a keyboard, mouse, pen, voice input, etc. and/or output device(s) 516 such as a display, speakers, printer, etc. Also included in the environment may be one or more communication connection(s) 512, such as LAN, WAN, point to point, etc.

Computing environment 500 may include at least some form of computer readable media. The computer readable media may be any available media that can be accessed by processing unit 502 or other devices comprising the computing environment. For example, the computer readable media may include computer storage media and communication media. The computer storage media may include volatile and nonvolatile, removable and non-removable media implemented in any method or technology for storage of information such as computer readable instructions, data structures, program modules or other data. The computer storage media may include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium, which can be used to store the desired information. The computer storage media may not include communication media.

The communication media may embody computer readable instructions, data structures, program modules, or other data in a modulated data signal such as a carrier wave or other transport mechanism and includes any information delivery media. The term "modulated data signal" may mean a signal that has one or more of its characteristics set or changed in such a manner as to encode information in the signal. For example, the communication media may include a wired media such as a wired network or direct-wired connection, and wireless media such as acoustic, RF, infrared and other wireless media. Combinations of the any of the above should also be included within the scope of computer readable media.

The computing environment 500 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets, and the Internet.

The different aspects described herein may be employed using software, hardware, or a combination of software and hardware to implement and perform the systems and methods disclosed herein. Although specific devices have been recited throughout the disclosure as performing specific functions, one skilled in the art will appreciate that these devices are provided for illustrative purposes, and other devices may be employed to perform the functionality disclosed herein without departing from the scope of the disclosure.

As stated above, a number of program modules and data files may be stored in the system memory 504. While executing on the processing unit 502, program modules (e.g., applications, Input/Output (I/O) management, and other utilities) may perform processes including, but not limited to, one or more of the stages of the operational methods described herein.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing environment 500 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

As will be understood from the foregoing disclosure, one aspect of the technology relates to a vehicle. The vehicle comprises: a plurality of ground-engaging members; a frame supported by the plurality of ground-engaging members; an electric motor supported by the frame; and a motor controller electrically coupled to the electric motor. The memory controller comprises: a processor; and a memory storing instructions that, when executed by the processor, cause the controller to perform a set of operations. The set of operations comprises: evaluating, based on a temperature threshold, a temperature of a temperature sensor associated with the electric motor; when the temperature exceeds the temperature threshold, operating the electric motor according to a normal control scheme; and when the temperature does not exceed the temperature threshold, operating the electric motor according to a heating control scheme. In an example, the temperature threshold is a first temperature threshold; the heating control scheme is a dynamic heating control scheme; the electric motor is operated according to the dynamic heating control scheme when: the temperature does not exceed the first temperature threshold; and the temperature exceeds a second temperature threshold less than the first temperature threshold; and the set of operations further comprises, when the temperature does not exceed the second temperature threshold, operating the electric motor according to a static heating control scheme. In another example, the vehicle further comprises a gearbox that includes a first gearset; and the electric motor is disposed within the gearbox and is mechanically coupled to the first gearset, thereby permitting heat to propagate from the electric motor to the first gearset as a result of operating the electric motor according to the heating control scheme. In a further example, the gearbox further comprises the temperature sensor and the temperature sensor is configured to sense the temperature of the first gearset. In yet another example, the gearbox further comprises an insulating layer disposed between an inner surface of the gearbox and the electric motor. In a further still example, the electric motor is coupled to one of the ground-engaging members or a robotic arm of the vehicle. In another example, the heating control scheme comprises at least one of: inducing single-phasing of the electric motor; or generating an induction control signal that comprises a higher frequency signal as compared to the normal control scheme. In a further example, the heating control scheme is a dynamic heating control scheme; and the induction control signal comprises a normal control signal for mechanical operation of the electric motor in addition to the higher frequency signal.

In another aspect, the technology relates to a method for self-heating motor control. The method comprises: obtaining a first temperature associated with an electric motor; evaluating the first temperature based on a first temperature threshold; based on determining the first temperature does not exceed the first temperature threshold, operating the electric motor according to a static heating control scheme; obtaining a second temperature associated with the electric motor; evaluating the second temperature based on the first temperature threshold and a second temperature threshold that is warmer than the first temperature threshold; based on determining the second temperature exceeds the first temperature threshold and does not exceed the second temperature threshold, operating the electric motor according to a dynamic heating control scheme; obtaining a third temperature associated with the electric motor; and based on determining the third temperature exceeds the second temperature threshold, operating the electric motor according to a normal heating control scheme. In an example, the static heating control scheme comprises generating an induction control signal that comprises a higher frequency signal as compared to the normal control scheme. In another example, the dynamic heating control scheme comprises at least one of: inducing single-phasing of the electric motor; or generating an induction control signal that comprises a higher frequency signal as compared to the normal control scheme. In a further example, the single-phasing is induced for a first subpart of a duty cycle of the electric motor. In yet another example, the first temperature is obtained from a temperature sensor of the electric motor. In a further still example, the second temperature is obtained from a temperature sensor of a component that is mechanically coupled to the electric motor.

In a further aspect, the technology relates to a computer storage media storing instructions that, when executed by a motor controller, cause the motor controller to: obtain a temperature associated with an electric motor; evaluate the temperature based on a temperature threshold; based on determining the temperature does not exceed the temperature threshold, operate the electric motor according to a heating control scheme; and based on determining the temperature does exceed the temperature threshold, operate the electric motor according to a normal control scheme. In an example, the heating control scheme does not include mechanical operation of the electric motor. In another example, the temperature is a first temperature; the temperature threshold is a first temperature threshold; and the computer storage media further comprises instructions that, when executed by the motor controller, cause the motor controller to: determine, during operation of the electric motor according to the normal control scheme, that a second temperature associated with the motor does not exceed a second temperature threshold; and based on determining the second temperature does not exceed the second temperature threshold: operating the electric motor according to a dynamic heating control scheme; and once a temperature associated with the electric motor exceeds the second temperature threshold, resuming operation of the electric motor according to the normal control scheme. In a further example, the first temperature threshold and the second temperature threshold are different. In yet another example, the dynamic heating control scheme comprises at least one of: a maximum rotational speed for the electric motor; or a maximum torque output for the electric motor. In a further still example, the temperature associated with the electric motor is obtained from a temperature sensor of a gearbox for the electric motor.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A vehicle, comprising:
- a plurality of ground-engaging members;
- a frame supported by the plurality of ground-engaging members;
- an electric motor supported by the frame; and
- a motor controller electrically coupled to the electric motor, the motor controller comprising:
  - a processor; and
  - a memory storing instructions that, when executed by the processor, cause the controller to perform a set of operations, comprising:
    - evaluating, based on a temperature threshold, a temperature of a temperature sensor associated with the electric motor;
    - when the temperature exceeds the temperature threshold, operating the electric motor according to a normal control scheme; and
    - when the temperature does not exceed the temperature threshold, operating the electric motor according to a heating control scheme.

2. The vehicle of claim 1, wherein:
- the temperature threshold is a first temperature threshold;
- the heating control scheme is a dynamic heating control scheme;
- the electric motor is operated according to the dynamic heating control scheme when:
  - the temperature does not exceed the first temperature threshold; and
  - the temperature exceeds a second temperature threshold less than the first temperature threshold; and
- the set of operations further comprises, when the temperature does not exceed the second temperature threshold, operating the electric motor according to a static heating control scheme.

3. The vehicle of claim 1, wherein:
- the vehicle further comprises a gearbox that includes a first gearset; and
- the electric motor is disposed within the gearbox and is mechanically coupled to the first gearset, thereby permitting heat to propagate from the electric motor to the first gearset as a result of operating the electric motor according to the heating control scheme.

4. The vehicle of claim 3, wherein the gearbox further comprises the temperature sensor and the temperature sensor is configured to sense the temperature of the first gearset.

5. The vehicle of claim 3, wherein the gearbox further comprises an insulating layer disposed between an inner surface of the gearbox and the electric motor.

6. The vehicle of claim 1, wherein the electric motor is coupled to one of the ground-engaging members or a robotic arm of the vehicle.

7. The vehicle of claim 1, wherein the heating control scheme comprises at least one of:
- inducing single-phasing of the electric motor; or
- generating an induction control signal that comprises a higher frequency signal as compared to the normal control scheme.

8. The vehicle of claim 7, wherein:
- the heating control scheme is a dynamic heating control scheme; and
- the induction control signal comprises a normal control signal for mechanical operation of the electric motor in addition to the higher frequency signal.

9. A method for self-heating motor control, the method comprising:
- obtaining a first temperature associated with an electric motor;
- evaluating the first temperature based on a first temperature threshold;
- based on determining the first temperature does not exceed the first temperature threshold, operating the electric motor according to a static heating control scheme;
- obtaining a second temperature associated with the electric motor;
- evaluating the second temperature based on the first temperature threshold and a second temperature threshold that is warmer than the first temperature threshold;

based on determining the second temperature exceeds the first temperature threshold and does not exceed the second temperature threshold, operating the electric motor according to a dynamic heating control scheme;

obtaining a third temperature associated with the electric motor; and based on determining the third temperature exceeds the second temperature threshold, operating the electric motor according to a normal heating control scheme.

10. The method of claim 9, wherein the static heating control scheme comprises generating an induction control signal that comprises a higher frequency signal as compared to the normal control scheme.

11. The method of claim 9, the dynamic heating control scheme comprises at least one of:

inducing single-phasing of the electric motor; or generating an induction control signal that comprises a higher frequency signal as compared to the normal control scheme.

12. The method of claim 11, wherein the single-phasing is induced for a first subpart of a duty cycle of the electric motor.

13. The method of claim 9, wherein the first temperature is obtained from a temperature sensor of the electric motor.

14. The method of claim 9, wherein the second temperature is obtained from a temperature sensor of a component that is mechanically coupled to the electric motor.

15. A computer storage media storing instructions that, when executed by a motor controller, cause the motor controller to:

obtain a temperature associated with an electric motor;

evaluate the temperature based on a temperature threshold;

based on determining the temperature does not exceed the temperature threshold, operate the electric motor according to a heating control scheme; and based on determining the temperature does exceed the temperature threshold, operate the electric motor according to a normal control scheme.

16. The computer storage media of claim 15, wherein the heating control scheme does not include mechanical operation of the electric motor.

17. The computer storage media of claim 15, wherein:

the temperature is a first temperature;

the temperature threshold is a first temperature threshold; and the computer storage media further comprises instructions that, when executed by the motor controller, cause the motor controller to:

determine, during operation of the electric motor according to the normal control scheme, that a second temperature associated with the motor does not exceed a second temperature threshold; and based on determining the second temperature does not exceed the second temperature threshold:

operating the electric motor according to a dynamic heating control scheme; and once a temperature associated with the electric motor exceeds the second temperature threshold, resuming operation of the electric motor according to the normal control scheme.

18. The computer storage media of claim 17, wherein the first temperature threshold and the second temperature threshold are different.

19. The computer storage media of claim 17, wherein the dynamic heating control scheme comprises at least one of:

a maximum rotational speed for the electric motor; or a maximum torque output for the electric motor.

20. The computer storage media of claim 15, wherein the temperature associated with the electric motor is obtained from a temperature sensor of a gearbox for the electric motor.

* * * * *